US008458666B2

(12) United States Patent
Mitra (10) Patent No.: US 8,458,666 B2
(45) Date of Patent: Jun. 4, 2013

(54) METHODS AND SYSTEMS FOR IMPLEMENTING A TEST AUTOMATION FRAMEWORK FOR TESTING SOFTWARE APPLICATIONS ON UNIX/LINUX BASED MACHINES

(75) Inventor: Saurabh Mitra, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 919 days.

(21) Appl. No.: 12/256,214

(22) Filed: Oct. 22, 2008

(65) Prior Publication Data

US 2010/0100872 A1    Apr. 22, 2010

(51) Int. Cl.
*G06F 9/44* (2006.01)

(52) U.S. Cl.
USPC .......................................................... 717/125

(58) Field of Classification Search
USPC .......................................................... 717/125
See application file for complete search history.

(56) References Cited

U.S. PATENT DOCUMENTS

| | | | | | |
|---|---|---|---|---|---|
| 5,021,997 | A | * | 6/1991 | Archie et al. .................... | 714/31 |
| 5,349,682 | A | * | 9/1994 | Rosenberry .................... | 718/102 |
| 5,898,419 | A | * | 4/1999 | Liu ................................. | 345/660 |
| 6,662,312 | B1 | * | 12/2003 | Keller et al. .................... | 717/124 |
| 6,769,122 | B1 | * | 7/2004 | Daudel ........................... | 718/102 |
| 7,296,188 | B2 | * | 11/2007 | Paternostro et al. ............ | 717/124 |
| 7,340,725 | B1 | * | 3/2008 | Robinson et al. ............... | 717/124 |
| 7,631,227 | B2 | * | 12/2009 | Poisson et al. .................. | 714/43 |
| 2002/0162059 | A1 | * | 10/2002 | McNeely et al. ............... | 714/703 |
| 2003/0140138 | A1 | * | 7/2003 | Dygon et al. ................... | 709/224 |
| 2004/0107415 | A1 | * | 6/2004 | Melamed et al. ............... | 717/124 |
| 2004/0260982 | A1 | * | 12/2004 | Bhowmik et al. .............. | 714/43 |
| 2007/0234293 | A1 | * | 10/2007 | Noller et al. .................... | 717/124 |
| 2008/0126880 | A1 | * | 5/2008 | Hegarty et al. ................. | 714/46 |
| 2009/0077421 | A1 | * | 3/2009 | Matsumoto ..................... | 714/26 |
| 2011/0231825 | A1 | * | 9/2011 | Grechanik et al. ............. | 717/126 |

OTHER PUBLICATIONS

Bondavalli et al. "A Fault-Tolerant Distributed Legacy-Based System and Its Evaluation", Springer-Verlag Berlin Heidelberg, 2003.*
Ducasse et al. "Object-Oriented Legacy System Trace-based Logic Testing", IEEE, 2006.*
Bret Pettichord, "Success with Test Automation", Quality Week, San Francisco, May 1996.*
Taimur Aslam, "A Taxonomy of Security Faults in the UNIX Operating System", Purdue University, Aug. 1995.*

* cited by examiner

*Primary Examiner* — Wei Zhen
*Assistant Examiner* — Junchun Wu
(74) *Attorney, Agent, or Firm* — Kilpatrick Townsend & Stockton LLP (57) ABSTRACT

This disclosure describes, generally, methods and systems for implementing a test automation framework. The method may include receiving test scenarios. Each of the test scenarios may include at least one test case. The method may further include spawning a process for each of the test scenarios. The processes may be executed in parallel on a Linux based operating system. The method may parse each of the test cases using a parser, execute the parsed test cases using an execution module, and generate test results for each of the test scenarios. Further, the method may display the test results on a Windows based graphical user interface (GUI).

19 Claims, 10 Drawing Sheets

METHODS AND SYSTEMS FOR IMPLEMENTING A TEST AUTOMATION FRAMEWORK FOR TESTING SOFTWARE APPLICATIONS ON UNIX/LINUX BASED MACHINES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to test automation frameworks and, more particularly, to test automation frameworks for non-GUI software applications running on UNIX and/or LINUX.

BACKGROUND

Presently, a number of Windows based graphical user interface (GUI) test automation tools exist. Such tools are only able to test Windows based software applications. However, no GUI test automation tools exist for testing UNIX and/or LINUX (hereafter Linux will be used to generically represent UNIX and/or LINUX operating systems) based applications.

As such, currently, in order to test Linux based applications, a tester is required to perform ad hoc testing and is only able to view test results through a command line interface. Accordingly, the tester must search through the lines of the commend line output line-by-line in order to determine errors and other non-standard activity. Such a process is very time consuming and inefficient. Hence, there is a need for improved methods and systems in the art.

BRIEF SUMMARY

Embodiments of the present invention are directed to a method of implementing a test automation framework. The method may include receiving test scenarios. Each of the test scenarios may include at least one test case. The method may further include spawning a process for each of the test scenarios. The processes may be executed in parallel on a Linux based operating system. The method may parse each of the test cases using a parser, execute the parsed test cases using an execution module, and generate test results for each of the test cases. Further, the method may display the test results on a Windows based graphical user interface (GUI).

According to further embodiments, a system for implementing a test automation framework is described. The system may include a storage device which is configured to store test scenarios. Each of the test scenarios may include one or more test cases. The system may further include a Linux test automation framework coupled with the storage device. The test automation framework may be configured to receive the test scenarios from the storage device. The test automation framework may include a spawning module configured to spawn a process for each of the test scenarios. The processes are executed in parallel on a Linux based operating system. The test automation framework may also include a parser module configured to parse each of the test cases (within a scenario) and an execution module configured to execute the parsed test cases and generate test results for each of the test scenarios.

The system may further include a middle tier application server coupled with the Linux test automation framework. The middle tier application server may be configured to receive the test results, convert the test results from XML into an HTML format, and transmit the HTML formatted test results. The system may further include a Windows based device coupled with the middle tier application server. The Windows based device may be configured to receive the HTML formatted test results and display the HTML formatted test results in a browser.

In an alternative embodiment, a machine-readable medium is described. The machine-readable medium may include instructions for receiving test scenarios. Each of the test scenarios may include at least one test case. The machine-readable medium may further include instructions for spawning a process for each of the test scenarios. The processes may be executed in parallel on a Linux based operating system. The machine-readable medium may include instructions to parse each of the test cases using a parser, execute the parsed test cases using an execution module, and generate test results for each of the test scenarios. Further, the machine-readable medium may include instructions to display the test results on a Windows based GUI.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Figure 1:
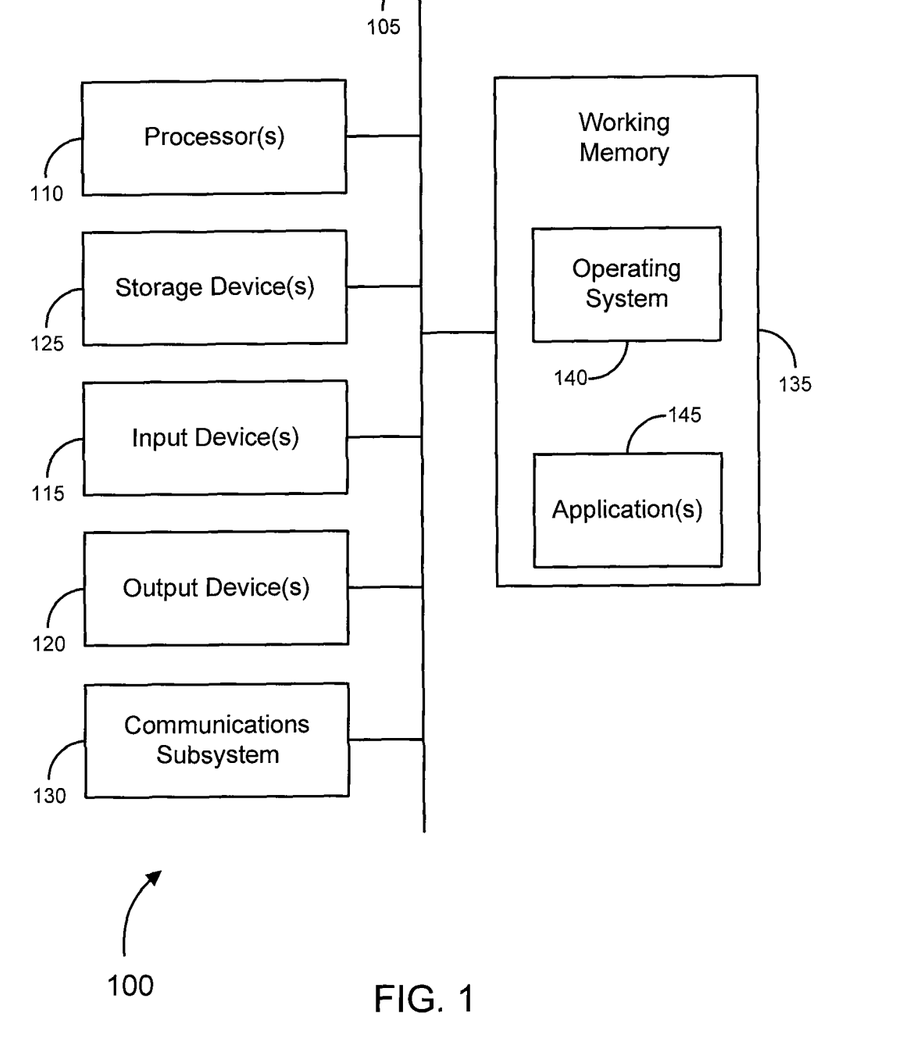
FIG. 1 is a generalized schematic diagram illustrating a computer system, in accordance with various embodiments of the invention.
Figure 5:
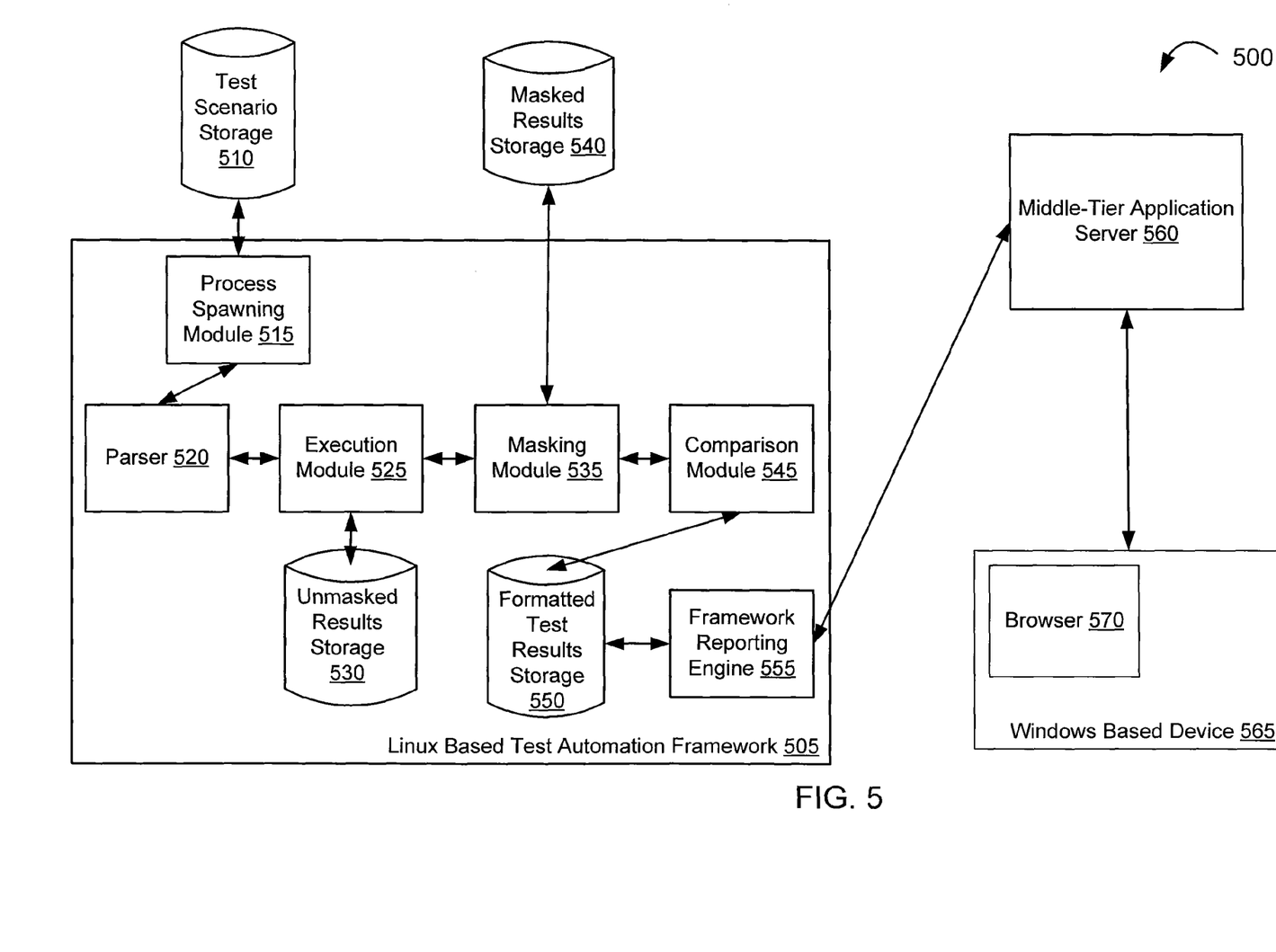
FIG. 5 is a block diagram illustrating a system for implementing a test automation framework according to embodiments of the present invention.

FIG. 1 provides a schematic illustration of one embodiment of a computer system 100 that can perform the methods of the invention, as described herein, and/or can function, for example, as any part of Linux based test automation framework 505 (FIG. 5) or Windows based device 565 (FIG. 5). It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation one or more general-purpose processors and/or one or more special-purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 100 might also include a communications subsystem 130, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation dynamic memory, such as the working memory 135. Transmission media includes coaxial cables, copper wire and fiber optics, including the wires that comprise the bus 105, as well as the various components of the communication subsystem 130 (and/or the media by which the communications subsystem 130 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 105 retrieves and executes the instructions. The instructions received by the working memory 135 may optionally be stored on a storage device 125 either before or after execution by the processor(s) 110.

Figure 2:
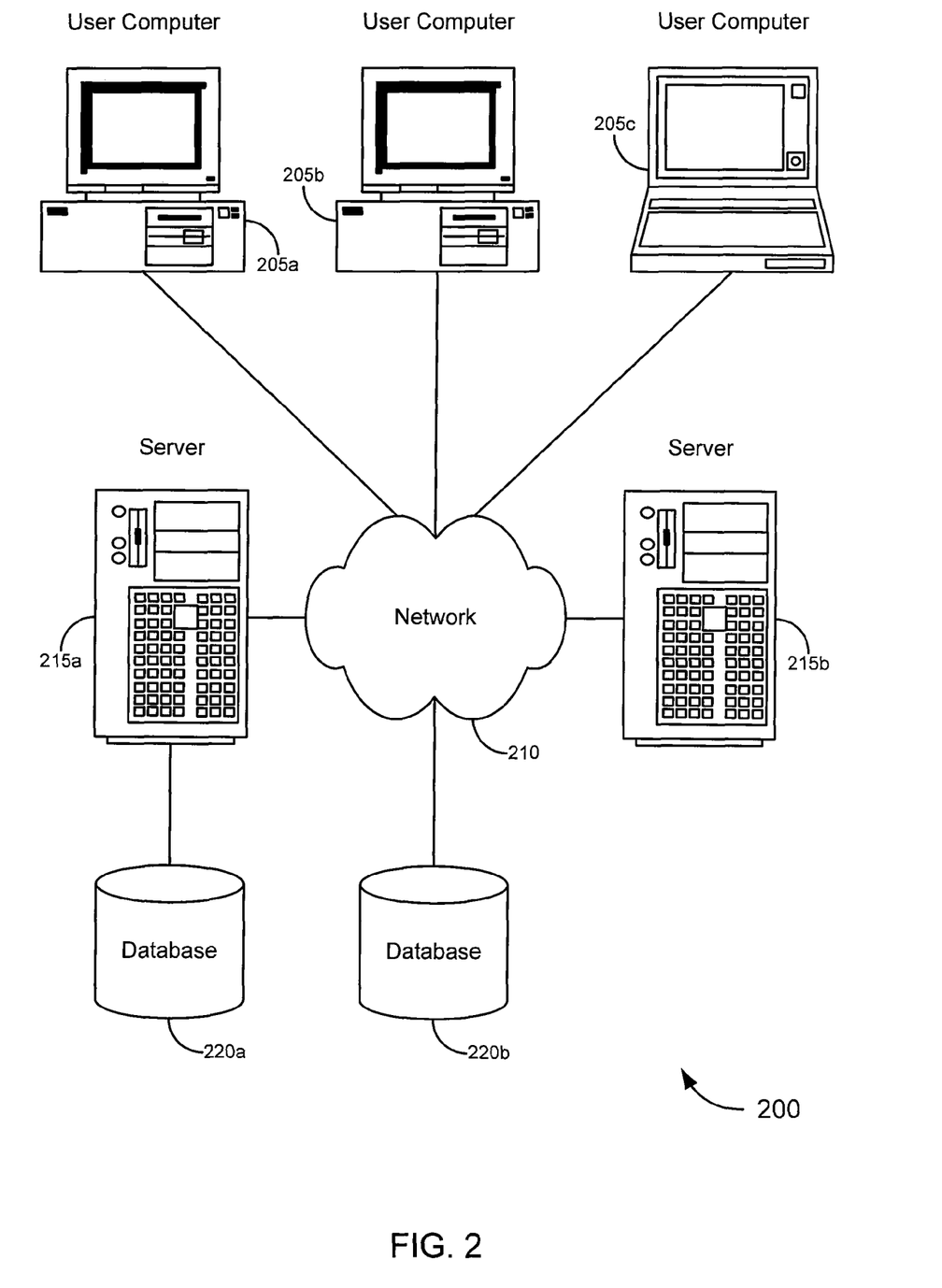
FIG. 2 is a block diagram illustrating a networked system of computers, which can be used in accordance with various embodiments of the invention.

A set of embodiments comprises systems for implementing staged configurator modeling. In one embodiment, user computers 205 and/or servers 215 may be implemented as computer system 100 in FIG. 1. Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents.

Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially-available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 205 and/or another server 215. In some embodiments, an application server can create web pages dynamically for displaying the information in accordance with embodiments of the invention, such as web pages displayed by middle-tier application server 505 in FIG. 5. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary: merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle database, that is adapted to store, update, and retrieve data in response to SQL-formatted commands. The database might be controlled and/or maintained by a database server, as described above, for example.

Figure 3:
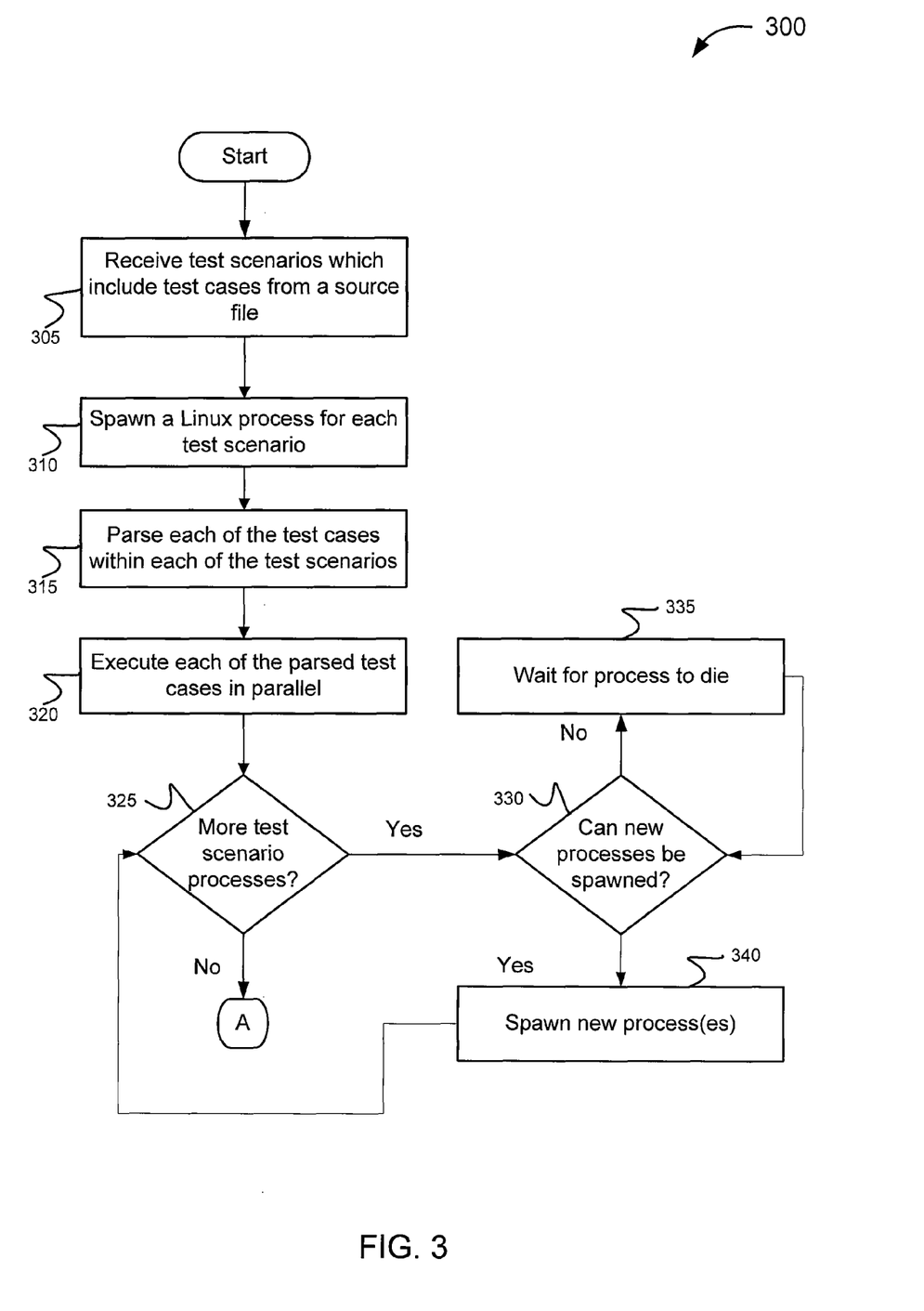
FIG. 3 is a flow diagram illustrating a test automation framework according to one embodiment of the present invention.

In one embodiment, server 215 or user computer 205 may be used to implement middle-tier server 560 (FIG. 5) or Windows based device 565 (FIG. 5). Turning now to FIG. 3, which illustrates a method 300 of implementing a test automation framework according to embodiments of the present invention. At process block 305, test scenarios may be received by the test automation framework which includes one or more test source file(s). In one embodiment, the test source file may be a Microsoft™ Excel file, a text file, a Microsoft™ Word document, a database source (i.e., an Oracle™ database), or any other legacy test scenario source file. In other words, the test automation framework is configured to accept any type of test source file. For example, if a company already has a test framework implemented which uses a legacy or other specific test source file type, and the company has already generated a number of test scenarios using that framework, the test automation framework according to the present invention is able to read that test source file. Accordingly, the test automation framework of the present invention is configured to universally accept and execute any test source type.

In a further embodiment, the test automation framework may be configured to execute tests for Linux and/or Unix (hereinafter "Linux") based systems. As described above no graphical test reporting test automation frameworks exist for Linux based systems; however, the test automation framework of the present invention is configured to provide a graphical test reporting for Linux based systems.

At process block 310, a Linux process may be spawned for each test scenario found in the test file. Each test scenario may have any number of test cases included within the scenario. For example, the test source file may include four test scenarios where the first scenario includes three test cases; the second scenario includes two test cases, and so forth. Furthermore, if a test run includes of four test scenarios (in four different test source files), then four processes would be spawned to execute each of the test scenarios. All four of these spawned processes for each test scenario may be executed in parallel, thus utilizing system resources in the most efficient way possible and allowing for faster execution than serially executed testing. Each process may be responsible for executing all the test cases belonging to a scenario. Furthermore, the process may execute of all test cases within a scenario in a serial manner.

In an alternative embodiment, the test cases may be implemented using a keyword driven approach. Sometimes the commands to be executed in a step of a test case might be lengthy and complex. In such cases a better approach may be to replace the complex commands by simpler keywords. A mapping is created between the exact command and the corresponding keyword used to reference it. The underlying parser for the test automation framework may also be configured to parse the keywords (i.e., using the mapping) and execute the corresponding commands thereby implementing the keyword driven methodology.

In a further embodiment, the number of processes to be spawned may be set to a default value, or alternatively the number of processes may be adjusted by an end user, system administrator, etc. The number of processes set may be determined by the number of test scenarios in a test source file. Furthermore, the number of processes may be limited to between one and ten processes in order to maintain a high level of efficiency. Alternatively, the number of processes may be determined based on the number of central processing units (CPUs) included within the host machine implementing the test automation framework. Furthermore, each process may be responsible for executing a single test scenario and each test case within the scenario may be executed serially by the spawned process.

At process block 315, each of test cases may be parsed by a parser module. In one embodiment, the parser module may be interchangeable (or loosely integrated into the test framework) in order to reduce the constraints on the format of test source files and/or test result formatting. For example, the parser module may be configured for Microsoft™ Excel test source input; however, the parser module may be exchanged to accommodate text document test source, a database test source, etc. Accordingly, any parser module may be exchanged and integrated into the test automation framework in order to accommodate any test source file type. Furthermore, the parser modules are implemented in a light-weight configuration which enables them to use very little system resources.

After the parser module has parsed the test case(s), the parsed data may then be passed/transmitted to an execution engine which is configured to execute the parsed test cases (process block 320). In one embodiment, the execution engine may be implemented using the Linux redirection feature. For example, the output obtained from the parser module may be used to generate a shell script with redirection operations which may be used when needed. The script may be executed in the shell using the UNIX/Linux system command which enables the execution engine to execute any program(s) and/or command(s). As such, the execution engine becomes terminal type independent.

At decision block 325, a determination is made whether additional test scenarios (in a test run) are yet to be processed. If additional test scenarios still need to be processed, then a check is performed to determine whether any new processes can be spawned or not (decision block 330). This check may be done based on a "maximum spawned processes at a time" count defined at the beginning of the test run. If the maximum spawned process count has been reached then the system may wait until any one of the process has finished execution and has died (process block 335) (thereby reducing the max spawned process count by one). If alternatively the maximum allowable spawned process count is not reached, then, at process block 340, new processes are spawned for additional scenarios/test source files. If additional spawned processes do exist, then the processes are continued to be run in parallel until each of the processes are killed (i.e., completed). Furthermore, method 300 is continued at connection point A.

Figure 4:
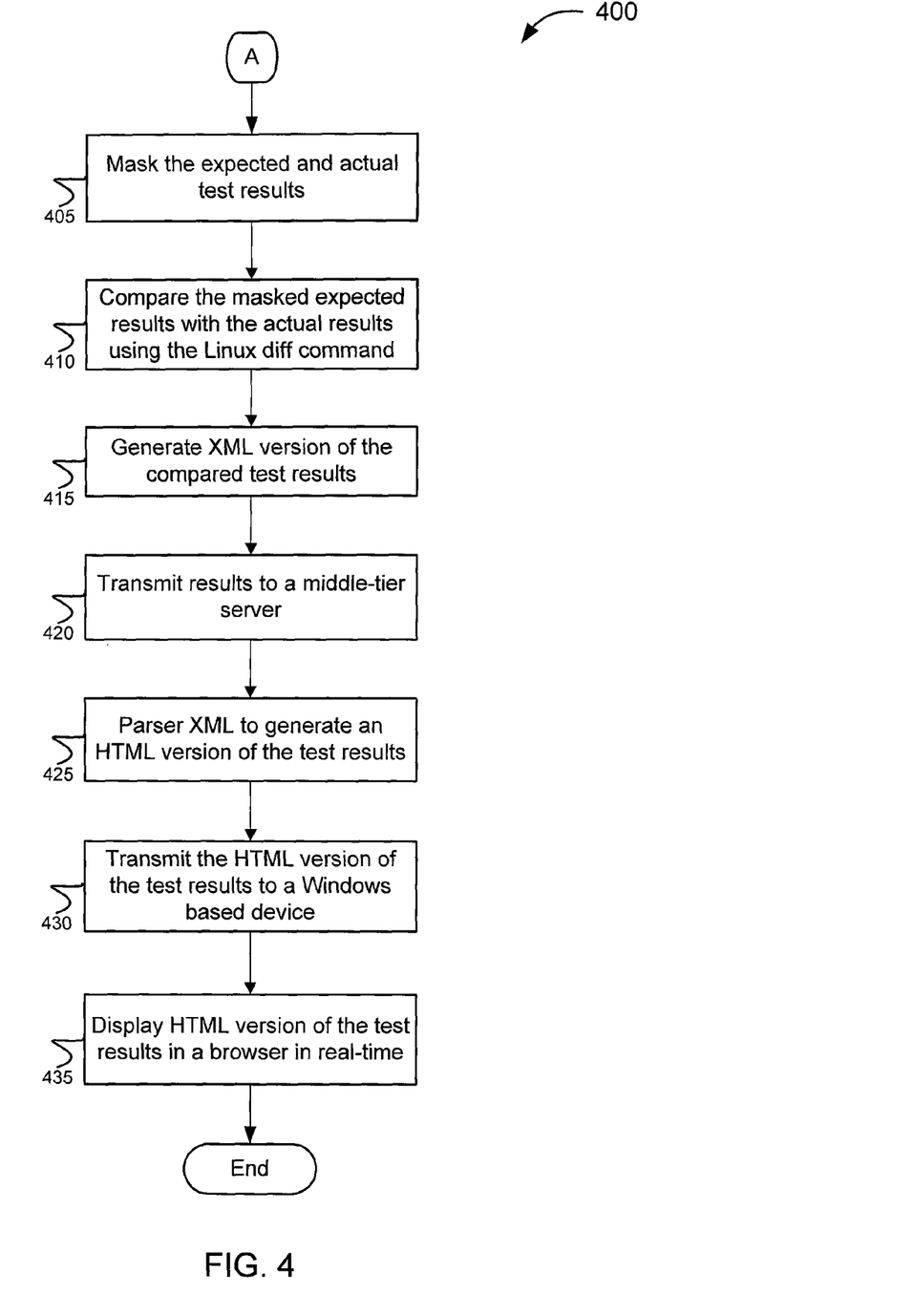
FIG. 4 is a flow diagram further illustrating a test automation framework according to one embodiment of the present invention.

Referring now to FIG. 4, which illustrates a method 400 of further implementing a test automation framework according to embodiments of the present invention. From connection point A in FIG. 3, the method continues at point A in FIG. 4. At process block 405, the expected and actual test results may be masked. In one embodiment, the expected and actual results may be masked in order to be able to change/modify the outcome and/or behavior of a program being tested. An administrator may be given the option of selecting certain expected and actual results to be masked. The option may be presented in a file and/or a user interface. For example, less useful information in the expected and actual results may be masked. Such less useful information may include the date of the test, the time of the test, the user ID of the user executing the test, etc. In addition, information that does not change from test run to test run may be masked. Furthermore, outdated or excepted or known errors may be masked out in order to allow an administrator or tester to not be distracted or slowed down by useless (or known) information presented in the test results.

Once the masking of the expected and actual results has occurred, the masked expected results may be compared with the masked actual results using, for example, the Linux "diff" command (process block 410). The "diff" command allows the differences in expected and actual masked results to be viewed side-by-side. Also, the "diff" command is extremely efficient and uses very little system resources which offers a significant performance increase.

At process block 415, XML version of the test results may be generated. In one embodiment, this XML version of the compared (see process block 415) test results is referred to as "test set XML." Test set XML may include all or some of the details of the compared test scenarios which have been executed as part of the test run, as well as the test cases included in the test scenarios. The "test set XML" may be grouped into scenarios where information regarding each scenario's ID, the count of total number of test cases belonging to the scenario, and the total number of passed and failed test cases for that scenario may be stored. Furthermore, each scenario tag within the "test set XML" in turn may list all the test cases which it contains including the test case ID, test case description, and the test case execution status. For each scenario a separate XML file may be created which may be grouped into test cases. Each test case belonging to that scenario may in turn list all the steps the test case includes, the step numbers, the exact command that is executed at each step, and the step's execution status. This level of XML hierarchy may facilitate better test reporting, such as the exact scenario which have failed can be reported and then can be drilled down to the test case which failed and the specific step in the test case that has failed. The "test set XML" and the scenario XML files are updated as a process has completed the execution of a test case and has determined the test case execution status (after comparing the expected and actual results). Hence, performance is increased because the test framework does not need to wait for the test set XML file to be generated after the tests have run; instead the test set XML file and the scenario XML files are updated simultaneously with the running of the tests.

At process block 420, the test set XML file(s) and the scenario XML files may then be transmitted to, for example, a middle-tier server. The middle-tier server then parses the XML file(s) and generates an HTML version of the test results (process block 425). The HTML version of the test results may be configured to be viewed on a Microsoft™ Windows based browser; however, Linux, Unix, Macintosh, etc. browser may also be used. Furthermore, the results may be formatted to be viewed on a cellular, handheld or other portable device.

At process block 430, the HTML version of the test results may be transmitted to a Windows based device. This allows the tester or other user to not have to login to a Linux machine to view the results on a command line printout or other similar display. Instead, the user is able to easily view the test results within a browser, or other similar program in a user-friendly environment (process block 435). Furthermore, because the results are generated as the test cases/scenarios are executed, the results are able to be displayed in the browser in real-time.

Alternatively, the above described test automation framework may be used to automate certain tasks. For example, instead of using test scenario source files, the source files may detail certain day-to-day jobs that could be automated. For example, system setup operations, backup operations, diagnostic operations, etc. may be automated using this framework by developing automation cases which can then be executed by the framework.

Turning now to FIG. 5, which illustrates system 500 for implementing a test automation framework according to embodiments of the present invention. In one embodiment, system 500 may include a Linux based test automation framework 505. Linux based test automation framework 505 may be connected with test scenario storage device 510. Test scenario storage 510 may be configured to store test scenarios to be used by Linux based test automation framework 505. The test scenarios may be in any file format, for example, test based files, database, Excel files, legacy files, specific application type files, etc.

In a further embodiment, Linux based test automation framework 505 may include a process spawning module 515 which is configured to receive test scenarios from test scenario storage device 510. Process spawning module 515 may spawn a Linux process for each scenario received. In one embodiment, the processes are executed in parallel to increase efficiency and speed of the testing. Linux based test automation framework 505 may farther include a parser 520 connected to process spawning module 515. Parser 520 may parse each of the test cases included in the test scenarios and pass the parsed data to an execution module 525 which is also included in Linux based test automation framework 505.

In one embodiment, parser 520 may be interchangeable with other parsers configured for use with various test source file types. For example, one parser may be used for a database test scenario source whereas another parser may be used for an Excel file test scenario source, and so forth. Accordingly, any test scenario source file type may be used and parser 520 may be exchanged to match any source file type.

Execution module 525 executes the test scenarios and stores unmasked results in an unmasked results storage 530 which is also included in Linux based test automation framework 505. Execution module 525 may then pass the test results to a masking module 535. Masking module 535 may then mask the expected and actual results based on specified user preferences and/or options. The masked expected and actual results may then be stored in masked results storage 540 which is connected to Linux based test automation framework 505.

In a farther embodiment, Linux based test automation framework 505 may include a comparison module 545, a formatted test results storage 550, and a framework reporting engine 555. Comparison module 545 may be configured to compare the masked expected test results with the masked actual test results. The compared results are then formatted and passed to formatted test results storage 550. Framework reporting engine 555 receives the formatted results and reports the results to a middle-tier application server 560 which is connected with Linux based test automation framework 505. In one embodiment, the results may be formatted into an XML format.

In one embodiment, middle-tier application server 560 may be configured to parse the XML formatted results and convert the results into an HTML format. The HTML formatted results may then be transmitted to a Windows based device 565 connected with middle-tier application server 560. Windows based device 565 may be, for example, a personal computer, a handheld device, a mobile computing device, a server, etc. Windows based device 565 may include a browser 570. Browser 570 may then display the HTML formatted results for viewing by a user, tester, administrator, etc.

Figure 6:
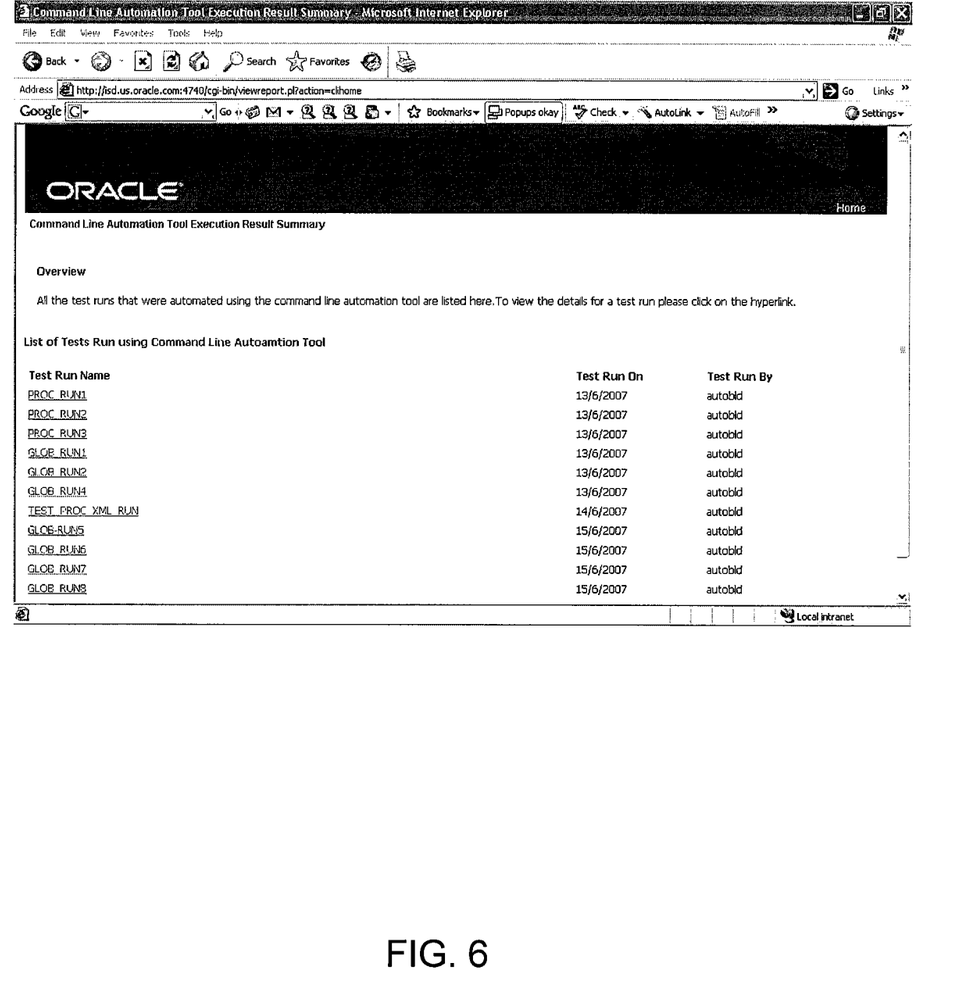
FIG. 6 is a graphical display illustrating a display of run level details for displayed test results according to embodiments of the present invention.
Figure 7:
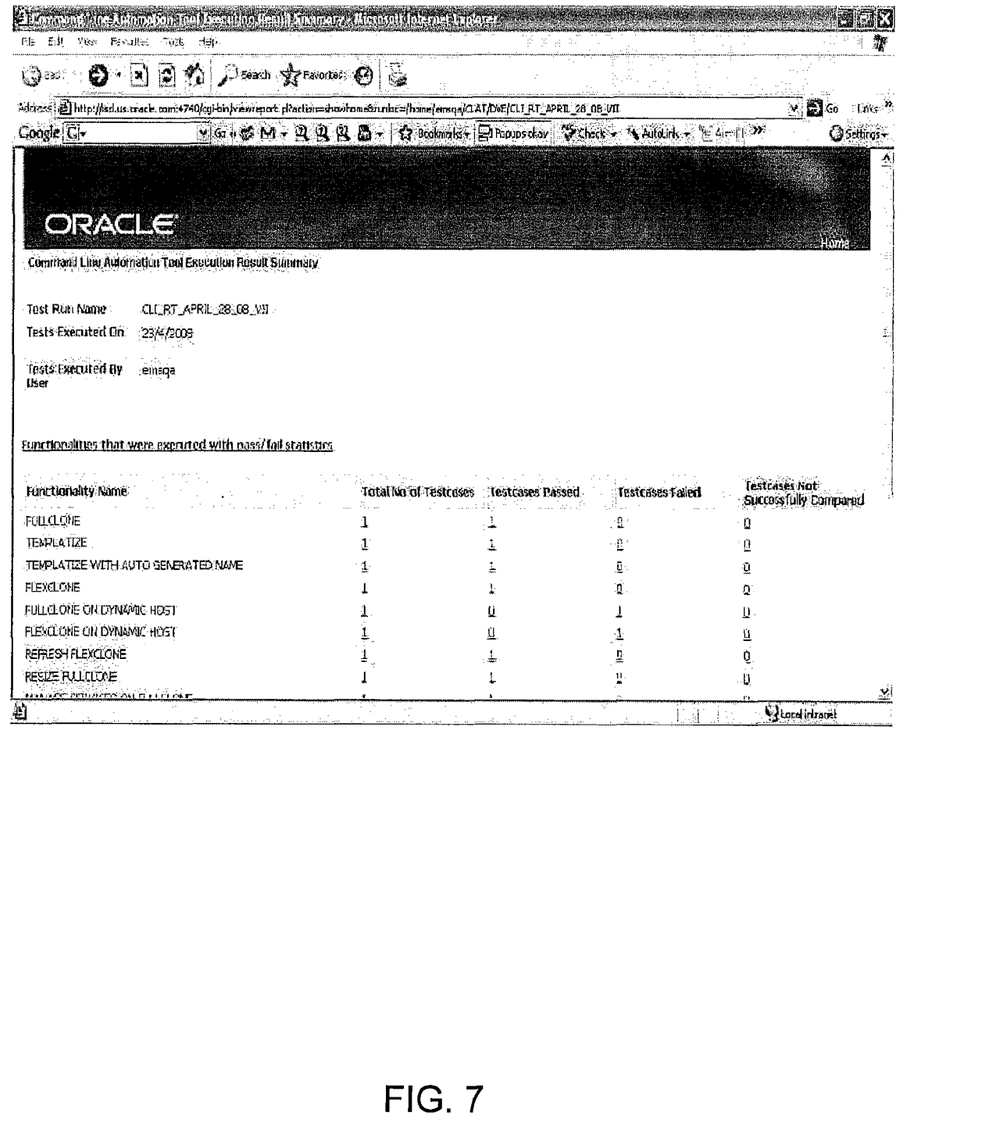
FIG. 7 is a graphical display illustrating a display of an execution summary for displayed test results categorized into business functionality according to embodiments of the present invention.

Browser 570 may display the results by a unique identifier inputted as the name for each test run. Various information regarding the test and the test results may also be displayed. For example, the test name, the date the test was run, the time the test was run, the user ID of the account which ran the test, etc (see FIG. 6). Furthermore, the display may include an execution summary which may include grouping by business functionality, the total number of test cases, the tests which have passed, the failed tests, as well as incomplete tests or test not successfully run (see FIG. 7).

Figure 8:
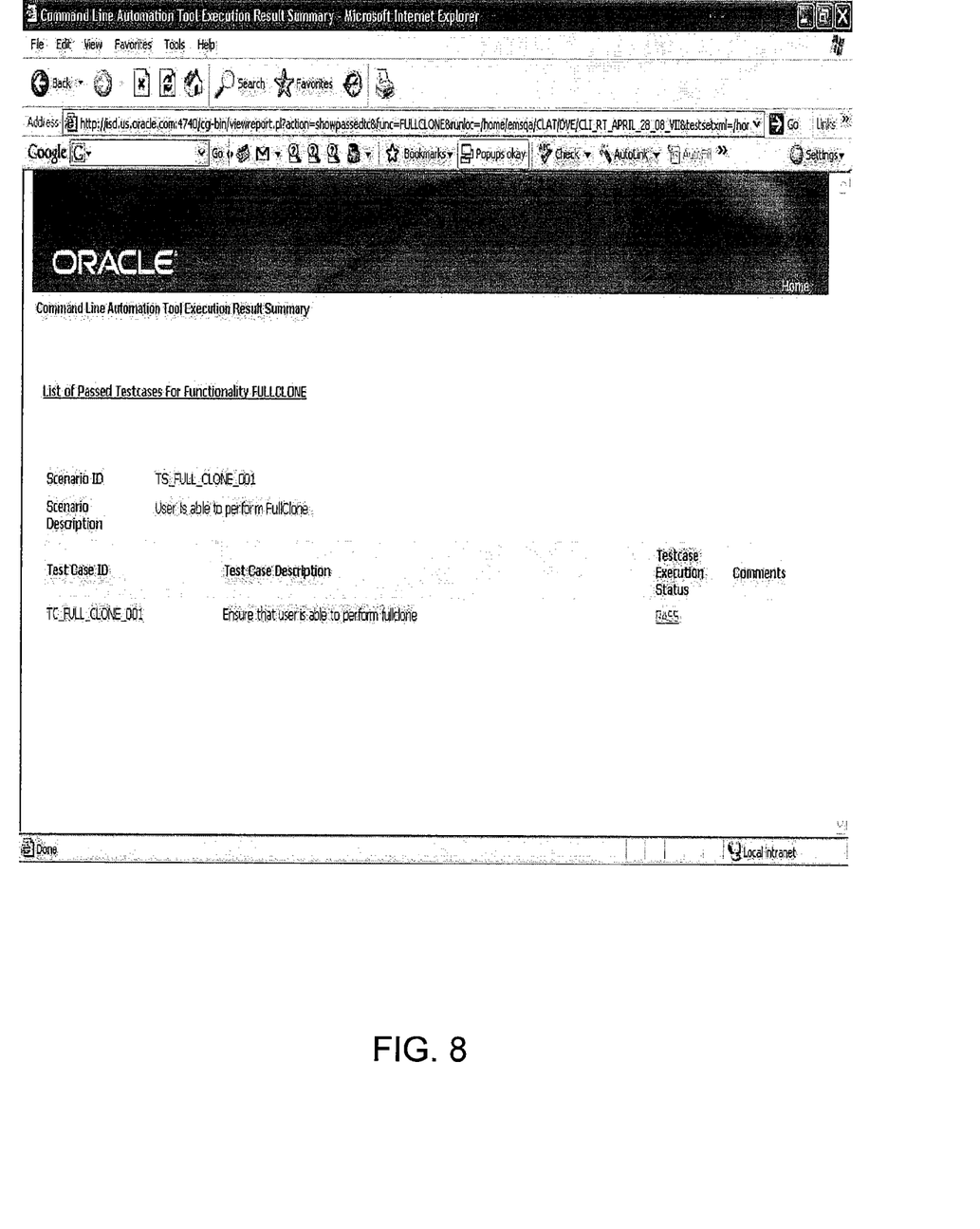
FIG. 8 is a graphical display illustrating a display of passed test cases for a specific business functionality according to embodiments of the present invention.
Figure 9A:
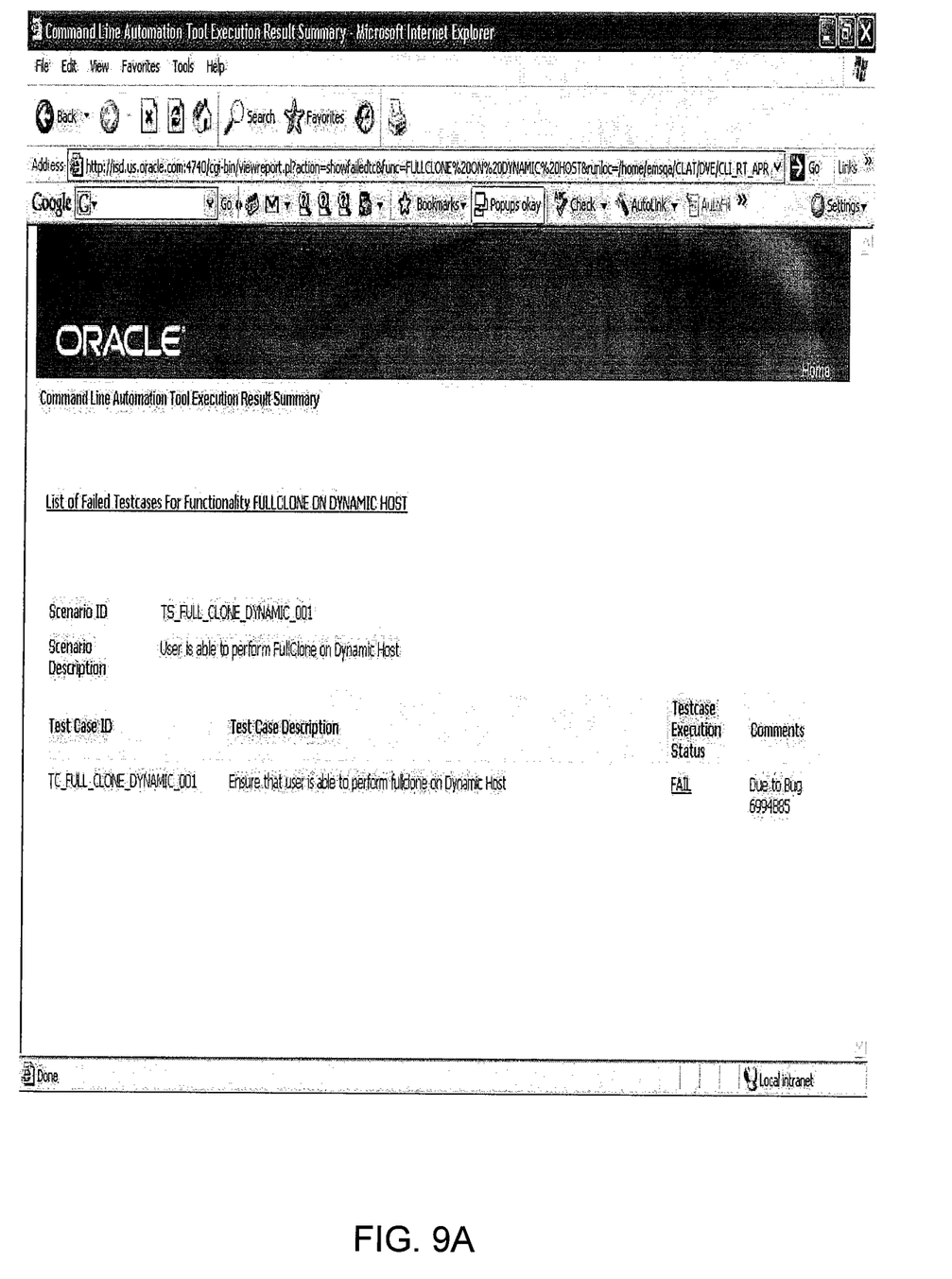
FIGS. 9A and 9B are graphical displays illustrating a display of failed test cases for a specific business functionality according to embodiments of the present invention.
Figure 9B:
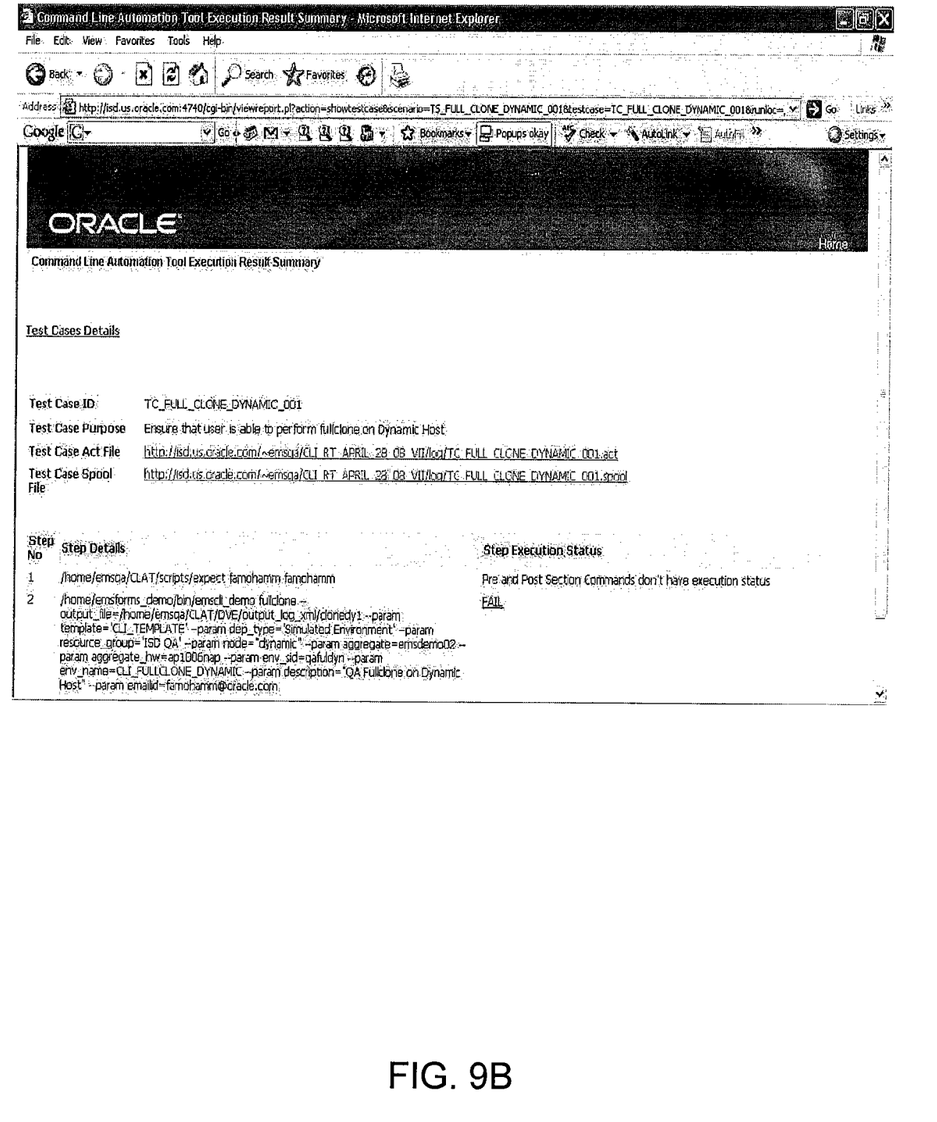

Additionally, FIG. 8 may include a passed test case display which may include a list of the test cases which have passed. In addition, the display may include each of the passed test cases for a given scenario, for all scenarios, or for a select number of scenarios. Similarly, FIG. 9A shows a failed test case display which, like the passed test case display, may show each of the failed test cases related to a scenario or scenarios. In addition, as shown in FIG. 9B, the details of each failed test case may be displayed. For example, the test case steps and their outcomes may be displayed to allow a user to easily determine the problem with the application or program being tested. Accordingly, embodiments of the present invention implement a scalable real-time graphical reporting test automation environment for Linux based operating systems.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer implemented method of implementing a test automation framework, the method comprising:
   receiving a plurality of test scenarios, wherein each of the plurality of legacy test scenarios includes at least one test case, each test case defined for a first operating system supporting the legacy test scenarios;
   determining if a maximum allowable spawned process count has been exceeded;
   in response to determining that the maximum allowable spawned process count has been exceeded, waiting for at least one process to terminate;
   in response to the at least one process terminating, spawning a process for each of the plurality of test scenarios, wherein the processes are executed in parallel on a second operating system different from the first operating system;
   parsing each of the test cases using a parser;
   generating a shell script for each of the parsed test cases, the shell scripts executable on the second operating system;
   executing the generated shell scripts for the parsed test cases using an execution module;
   based in part on the each of the plurality of test scenarios being spawned into separate processes and each of the processes being executed in parallel, generating test results for each of the test scenarios simultaneously as the test cases are being executed; and
   based in part on the test results for each of the test scenarios being simultaneously generated as the test cases are being executed, displaying, in real-time, the test results on a graphical user interface (GUI) of the first operating system.

2. The method of claim 1, wherein the test results include expected results and actual results.

3. The method of claim 2, further comprising masking the expected and actual results based on an applied filter.

4. The method of claim 3, wherein the applied filter includes one or more of the following: filtering outdated results, filtering unimportant results, and filtering unchanged results.

5. The method of claim 4, further comprising:
comparing the masked expected test results with the masked actual test results; and
transmitting the comparison to a test execution module configured to execute the comparison.

6. The method of claim 1, wherein the steps continue to be executed until each of the processes have completed execution.

7. The method of claim 1, further comprising converting the test results into an XML format.

8. The method of claim 7, further comprising parsing the XML formatted test results into HTML formatted test results.

9. The method of claim 8, wherein the GUI comprises an Internet browser.

10. The method of claim 9, wherein the Internet browser is configured to display the HTML formatted test results.

11. The method of claim 1, wherein the test results are displayed in real-time with the execution of the plurality of test scenarios.

12. The method of claim 1, wherein the plurality of scenarios include between one and ten scenarios which are defined by a default setting or based on processor load of a host machine executing the test automation framework.

13. The method of claim 1, wherein the parser is configured for a specific test scenario source type.

14. The method of claim 13, wherein the test scenario source types include one or more of the following: text source, excel source, database source, legacy application source, and doc source.

15. The method of claim 14, further comprising, based on the test scenario source type, exchanging the parser for a parser specifically used for the test scenario source type.

16. The method of claim 1, further comprising parsing keyword driven test cases from a test source file in order to support a keyword driven test methodology.

17. The method of claim 1, wherein the first operating system is Windows and the second operating system is Linux.

18. A system comprising:
a processor; and
a memory coupled with and readable by the processor and having stored therein a sequence of instructions which, when executed by the processor, cause the processor to implement a test automation framework by:
receiving a plurality of test scenarios, wherein each of the plurality of legacy test scenarios includes at least one test case, each test case defined for a first operating system supporting the legacy test scenarios;
determining if a maximum allowable spawned process count has been exceeded;
in response to determining that the maximum allowable spawned process count has been exceeded, waiting for at least one process to terminate;
in response to the at least one process terminating, spawning a process for each of the plurality of test scenarios, wherein the processes are executed in parallel on a second operating system different from the first operating system;
parsing each of the test cases using a parser;
generating a shell script for each of the parsed test cases, the shell scripts executable on the second operating system;
executing the generated shell scripts for the parsed test cases using an execution module;
based in part on the each of the plurality of test scenarios being spawned into separate processes and each of the processes being executed in parallel, generating test results for each of the test scenarios simultaneously as the test cases are being executed; and
based in part on the test results for each of the test scenarios being simultaneously generated as the test cases are being executed, displaying, in real-time, the test results on a graphical user interface (GUI) of the first operating system.

19. A computer-readable memory having stored therein a sequence of instruction which, when executed by a processor, causes the processor to implement a test automation framework by:
receiving a plurality of test scenarios, wherein each of the plurality of legacy test scenarios includes at least one test case, each test case defined for a first operating system supporting the legacy test scenarios;
determining if a maximum allowable spawned process count has been exceeded;
in response to determining that the maximum allowable spawned process count has been exceeded, waiting for at least one process to terminate;
in response to the at least one process terminating, spawning a process for each of the plurality of test scenarios, wherein the processes are executed in parallel on a second operating system different from the first operating system;
parsing each of the test cases using a parser;
generating a shell script for each of the parsed test cases, the shell scripts executable on the second operating system;
executing the generated shell scripts for the parsed test cases using an execution module;
based in part on the each of the plurality of test scenarios being spawned into separate processes and each of the processes being executed in parallel, generating test results for each of the test scenarios simultaneously as the test cases are being executed; and
based in part on the test results for each of the test scenarios being simultaneously generated as the test cases are being executed, displaying, in real-time, the test results on a graphical user interface (GUI) of the first operating system.

* * * * *

UNITED STATES PATENT AND TRADEMARK OFFICE
CERTIFICATE OF CORRECTION

PATENT NO. : 8,458,666 B2
APPLICATION NO. : 12/256214
DATED : June 4, 2013
INVENTOR(S) : Mitra It is certified that error appears in the above-identified patent and that said Letters Patent is hereby corrected as shown below:

In the Specification

In column 7, line 35, delete "Oracle" and insert -- Oracle™ --, therefor.

In column 10, line 56, delete "farther" and insert -- further --, therefor.

In column 11, line 11, delete "farther" and insert -- further --, therefor.

Signed and Sealed this
First Day of October, 2013

Teresa Stanek Rea
*Deputy Director of the United States Patent and Trademark Office*